United States Patent Office 3,700,655
Patented Oct. 24, 1972

3,700,655
ANTIBIOTICS OF AGRICULTURAL FUNGICIDES, POLYOXINS A AND B; AND PROCESS FOR PREPARING THE SAME
Saburo Suzuki, Kiyoshi Isono, and Junsaku Nagatsu, Tokyo, and Takeo Akashiba and Shigeki Sasaki, Kanagawa-ken, Japan, assignors to Rikagaku Kenkyusho, Yamato-machi, Kitaadachi-gun, Saitama-ken, Japan
Continuation-in-part of application Ser. No. 490,001, Sept. 24, 1965. This application July 12, 1968, Ser. No. 744,455
Claims priority, application Japan, Sept. 24, 1964, 39/54,088
Int. Cl. A61k 21/00
U.S. Cl. 260—211.5
17 Claims

ABSTRACT OF THE DISCLOSURE

Polyoxins A and B are each a novel antibiotic to be used as an agricultural fungicide for the protection of plants.

Said polyoxins A and B are prepared by collecting polyoxin complex containing polyoxins A and B from a culture medium in which has been cultivated a novel strain of *Streptomyces cacaoi* var. *asoensis* that is a mutant of *Streptomyces cacaoi* and is on deposit with the American Type Culture Collection (ATCC) in an unrestricted deposit as ATCC access numbers 19093 and 19094, and then separating said complex into each of polyoxins A and B.

CROSS-REFERENCE TO RELATED APPLICATION

This is a continuation-in-part application of the application Ser. No. 490,001 filed on Sept. 24, 1965, now abandoned, and is related to application Ser. No. 643,275, filed on June 2, 1967, now abandoned, which describes polyoxins D, E, F, G and H, and to application of Suzuki et al. describing polyoxins J, K and L.

BACKGROUND OF THE INVENTION

The present invention relates to polyoxins A and B which are novel antibiotics and to a process for preparing the same. Polyoxins A and B are described in Agr. Biol. Chem., vol. 29, No. 9, pages 848–854, 1965, and polyoxins D, E, F, G and H are described in Agr. Biol. Chem., vol. 30, No. 8, pages 813–814, 1966 and vol. 31, No. 2, pages 190–197, 1967. More particularly, it relates to novel antibiotics which have been named "Polyoxin A" and "Polyoxin B" deriving from the numerous (poly) number of oxygen (oxin) within the molecules and which have specific antifungal activity against various kinds of phytopathogenic fungi and which are to be used as agricultural fungicides for the protection of plants, and which are prepared by collecting polyoxin complex containing polyoxins A and B from a culture obtained by cultivating in a culture medium a novel strain of *Streptomyces cacaoi* var. *asoensis* Nos. 20–52, 20–60 (Type I) or No. 20–66 (Type II) that is a mutant of *Streptomyces cacaoi* belonging to *Streptomyces griseus* group and is on deposit with ATCC in unrestricted deposit as ATCC access numbers 19093 and 19094, respectively, and then separating the collected complex into each of polyoxins A and B by distribution chromatography using a solvent system to elute polyoxins A and B, or by repeated recrystallization from an aqueous solvent according to fractional crystallization technique; and it also relates to a process for the preparation thereof.

The novel strains, Nos. 20–52, 20–60 and No. 20–66 which are employed in the process of the invention were isolated from the soil collected in the Bochu Aso district of Kumamoto Prefecture, Japan.

The two strains, Nos. 20–52 and 20–60 have been designated herein as "Type I" and the strain, No. 20–66 has been designated herein as "Type II." Further, the novel strains of Type I and II employed herein have been named "*Streptomyces cacaoi* var. *asoensis*." The strains identified as *Streptomyces cacaoi* var. *asoensis*, Type I and II have been assigned the American Type Culture Collection (ATCC) as ATCC access numbers 19093 and 19094, respectively, and are on deposit with ATCC in an unrestricted deposit permitting the public full access to the cultures. The strains were released for distribution to the public on Mar. 27, 1968.

The strains of *Streptomyces cacaoi* var. *asoensis*, Type I and Type II are substantially identical to each other in morphological characteristics and in the property of utilization of carbon source. However, the strain of *Streptomyces cacaoi* var. *asoensis*, Type II is different in colour tone on the reverse of Czapek's agar and shows small differences on other agar preparations as compared with the strain of *Streptomyces cacaoi* var. *asoensis*, Type I.

The strain of *Streptomyces cacaoi* var. *asoensis* is similar to the three species *Streptomyces griseus*, *Streptomyces griseolus* and *Streptomyces cacaoi* among the known strains described in Bergey's Manual of Determination Bacteriology, 7th edition, or in the Actinomycetes, 2nd vol., authored by Waksman. In view of the detailed properties of *Streptomyces cacaoi* var. *asoensis*, it is considered that it belongs to *Streptomyces griseus* group.

When *Streptomyces cacaoi* var. *asoensis*, Type I showing the typical properties of *Streptomyces cacaoi* var. *asoensis* is compared with these species, differences of pigment producibility on Czapek's agar and calcium malate agar as to *Streptomyces griseolus*; differences of color tone of serial mycelia on various agar preparation as to *Streptomyces griseus*; and also the difference that said two species do not form spirals, are noticed which clearly distinguished *Streptomyces cacaoi* var. *asoensis* from said two strains. The morphological and cultural characteristics of *Streptomyces cacaoi* var. *asoensis* are most closely similar to those of *Streptomyces cacaoi*, although for *Streptomyces cacaoi* the serial mycelia are always white on nutrient agar, yellow pigment is formed on starch agar and no soluble pigment is formed on potatoe plug and gelatin. Therefore, *Streptomyces cacaoi* var. *asoensis* appears to belong to the species *Streptomyces cacaoi*, but based on these differences and the characteristic ability of *Streptomyces cacaoi* var. *asoensis* to produce novel antibiotics, polyoxins A and B, it is reasonable to consider it to be a mutant of *Streptomyces cacaoi*. *Streptomyces cacaoi* var. *asoensis*, Type II is naturally also included.

The microbial characteristics of novel strains of *Streptomyces cacaoi* var. *asoensis*, Type I and II which are capable of producing novel antibiotics, polyoxins A and B are as follows:

(1) Microscopic observation

Growth was observed to be good at from 20 to 32° C. Aerial mycelia are monopodially branched on synthetic agar and protein-containing agar media. Sporophores form open spirals and no whirls. The shape and size of spores are asymmetrically rod-like (1.5–1.8$\mu$ x 0.5–0.7$\mu$), or oval (1.2–1.0$\mu$ x 1.0–0.7$\mu$), and the spore surfaces are smooth.

(2) Cultural characteristics of *Streptomyces cacaoi* var. *asoensis*

(1) Czapek's agar (27° C.):
Type I.—Grows well in colorless or white buff, and forms abundant aerial mycelia which are powdery and changes from white to smoke-grey. The reverse is pale olive-yellow without soluble pigment.

Type II.—Forms aerial mycelia which are powdery and changes from white to tilleul-buff. The reverse is yellow-tinged with pale pink.

(2) Glycerine Czapek's agar (27° C.):

Type I.—Grows well, pale olive-buff. None or scant, thin white aerial mycelia are formed. The reverse is pale olive-buff or creamy without soluble pigment.

Type II.—No aerial mycelia formed, otherwise same as Type I.

(3) Nutrient agar (27° C.):

Type I.—Grows well, wrinkled, smoke-grey, and scant aerial mycelia are formed which change from white to pale grey. The reverse has a slight brown yellow color and produces brown soluble pigment.

Type II.—Grows same as type I and forms very scant aerial mycelia which are white to whitish grey. Soluble pigment obtained is less than for type I.

(4) Glucose peptone agar (27° C.):

Type I.—Grows from creamy to pale greyish-olive. None or scant, whitish grey aerial mycelia are formed. The reverse is pale brown and forms light brown soluble pigment.

Type II.—Grows scant with slight formation of white or yale grey aerial mycelia in the latter period of culture. The reverse is olive-buff.

(5) Glucose asparagine agar (27° C.):

Type I.—Grows wrinkled and changes from white to cartridge-buff, forming aerial mycelia from white to pale grey or grey in color. The reverse is cartridge-buff and yields no soluble pigment.

Type II.—Shows very little growth of aerial mycelia, some formation of white grey aerial mycelia occurs.

(6) Starch agar (27° C.):

Type I.—Grows well, colorless or olive-buff and forms abundant powdery, pale mouse-grey aerial mycelia. The reverse is olive-yellow and yields no soluble pigment. Hydrolyzing activity of starch is normal.

Type II.—Same as type I.

(7) Calcium malate agar (27° C.):

Type I.—Grows colorless or pale brown and yellow and forms abundant mouse-grey aerial mycelia. The reverse is creamy yellow and give some formation of light yellow-brown soluble pigment.

Type II.—Same as type I.

(8) Tyrosine agar (27° C.):

Type I.—Grows poor, brown color, forms no aerial mycelia. The reverse is creamy color and produces no soluble pigment.

Type II.—Same as type I.

(9) Egg albumin agar (27° C.):

Type I.—Grows well, colorless to white and forms substantially no aerial mycelia, but sometimes forms very small white aerial mycelia in the latter period of culture. The reverse is white but yields no soluble pigment.

Type II.—Same as type I.

(10) Oat meal agar culture medium (27° C.):

Type I.—Grows olive-buff and forms some pale grey aerial mycelia. Sometimes formation of aerial mycelia does not occur. The reverse is colorless and yields no soluble pigment.

Type II.—Same as type I.

(11) Potato plug (27° C.):

Type I.—Grows well, dark-olive and forms pale grey aerial mycelia. The medium changes color to pale smoke-grey.

Type II.—Same as type I.

(12) Gelatin stab (18° C.):

Type I.—Grows well and gelatin liquefaction is slight. Dark brown soluble pigment is produced to a small extent.

Type II.—Gives scarcely any gelatin liquefaction.

(13) Glucose broth (27° C.):

Type I.—Grows well on and under the surface of the solution and produces soluble brown pigment.

Type II.—Same as type I.

(14) Czapek's solution (27° C.):

Type I.—Grows well on the surface and at the bottom of the solution and forms thin membranes on the surface together with a little white aerial mycelia. Soluble pigment is not obtained.

Type II.—Produces no membrane on the surface.

(15) Melanin formation: Both type I and II are negative.

(16) Nitrate reduction: Both type I and II are slightly positive.

(17) Cellulose culture medium: There is no growth on synthetic culture solution containing cellulose as the sole carbon source.

(18) Nutrient (meat, peptone and glucose) agar medium:

Type I.—Grows good, light olive-buff and wrinkled, and it forms very scant white aerial mycelia or sometimes forms none of them. The reverse of the culture is white in color and type I produces black soluble pigment in a very small amount.

Type II.—Grows good, creamy-yellow, without formation of aerial mycelia. The reverse is smooth. Type II is similar to type I in other respects than described above.

(19) Löffler's serum medium (27° C.):

Type I.—grows good, olive-yellow and deep wrinkled, and forms no mycelia. If forms black soluble pigment in all small amount.

Type II.—same as type I.

(20) Litmus milk (27° C.):

Type I.—Grows forming brown circle on the surface and does not cause coagulation and peptonization. The pH value is 4.0–5.0 on the 20th day after the start of culture.

Type II.—Grows in whirls on the surface, and causes gradual coagulation with slight peptonization. The pH value is 7.8–8.0 on the 20th day after the start of culture.

(3) Physiological properties (1) Optimum conditions for growth:

pH—6–8 (type I, type II)
temperature—25–30° C. (type I, type II)
very aerobic—(type I, type II)

(2) Critical conditions for possible growth pH's—9 and 4 (type I), 10 and 4 (type II)
temperatures—18° C. and 37° C. (type I, type II)

(3) Tyrosinase: the reaction is weakly positive (type I, type II)

(4) Peptonization of milk:

type I, negative,
type II, positive.

(5) Decomposition of cellulose: Both type I and type II, negative.

(6) Chromogenic function: Weakly positive and occasionally negative.

(7) Utilization of carbon sources: The utilization of carbon sources determined according to T. G. Pridham is as follows:

| | Type I | Type II |
|---|---|---|
| Glucose | +++ | +++ |
| Sucrose | +++ | +++ |
| Starch | +++ | +++ |
| Lactose | ++ | +++ |
| Fructose | + | ++ |
| Maltose | +++ | ++ |
| Inulin | +++ | +++ |
| Inositol | ++ | ++ |
| Raffinose | +++ | +++ |
| Arabinose | + | + |
| Galactose | + | ++ |
| Xylose | + | + |
| Mannose | ++ | ++ |
| Rhamnose | +++ | +++ |
| Mannitol | +++ | +++ |
| Salicin | + | + |

Note.—+++=good growth, ++=medium growth, +=scant growth

According to the process of the present invention, polyoxin complex containing the antibiotics, polyoxins A and B can be produced using not only *Streptomyces cacaoi* var. *asoensis* described above, but also polyoxin producing natural and artificial mutants thereof.

In the practice of the present invention; the fermentation may be carried out according to the usual fermentation method for common Streptomyces. Generally speaking, starch, dextrin, glucose, glycerine, maltose, fructose and the like are used for carbon sources. Meat extracts, peptone, corn-steep liquor, soybean powder, peanut powder, cotton-seed powder, yeast and the like are used for nitrogen sources. Inorganic materials, for example, sodium chloride, potassium chloride, calcium carbonate, and other phosphates and the like may be added to the almost neutral liquid culture medium. The medium is inoculated with the strain of *Streptomyces cacaoi* var. *asoensis* and cultivation is carried out under stirring at a temperature of from about 25 to 35° C. In general the concentration of antibiotics produced reaches a maximum after from about 40 to 100 hours, e.g. 40 to 60 hours, of cultivation. Since this time of maximum concentration may vary according to the aeration and stirring conditions, even when using the same temperature and the culture medium of the same components, it is advisable to decide said time determining the potency in each case.

Commonly used physicochemical methods can be employed in order to isolate the antibiotics from the culture broth. For example, at first, the mycelia may be first removed by filtration with the addition of a filter-aid, such as an acid or neutral diatomaceous earth, and filtrate then adsorbed on activated carbon at acidic or neutral pH. The antibiotics can be eluted from the activated carbon by a solvent for the antibiotics i.e. a mixture of water and water miscible solvents, for example methanol, ethanol, propanol, butanol, acetone, acetic acid and pyridine. Since polyoxins are amphoteric compounds, they are adsorbed on either cation or anion exchange resins and are eluted by suitable acid, alkali or salt solutions. For example, the culture filtrate, after being made acidic, may be passed through a column containing Dowex 50 WX8 (H-type) (the word "Dowex" is a trademark), and the polyoxins that are adsorbed thereon are eluted therefrom by an aqueous solution of 5% sodium chloride or phosphate buffer of pH 4.3. The crude powder of polyoxin complex which is thus obtained can be purified by column-chromatographies using an ion-exchanger, such as sulfoethylsephadex (the word "Sephadex" is a trademark), sulfoethylcellulose or sulfomethylcellulose, or by a zone electrophoresis technique.

Complete separation of polyoxins A and B may be carried out by distribution-chromatography using cellulose powder or silica gel. It may be developed by a suitable solvent i.e. a mixture of water and water miscible solvents, for example methanol, ethanol, propanol, butanol acetone, acetic acid and pyridine. In this case, polyoxin A is eluted first, followed by polyoxin B. More conveniently, separation of polyoxins A and B is also possible by repeated recrystallization from aqueous solvent according to fractional crystallization technique.

By recrystallization from aqueous alcohol, polyoxin A is obtained in the form of colorless needles and polyoxin B is obtained as a crystalline powder.

The physico-chemical properties of polyoxins A and B are as follows:

(1) Decomposition points

Although neither polyoxin A (referred to hereinafter as A) nor polyoxin B (referred to hereinafter as B) shows a clear decomposition point, it is evident that A decomposes gradually without melting at temperatures above 180° C., whereas B decomposed at temperature above 160° C.

(2) Analytical data of elementary composition

Both A and B contain the elements carbon, hydrogen, nitrogen and oxygen in the following percentages by weight, the balance being oxygen:

A: C, 44.42, H, 5.10, N, 13.81
B: C, 40.18, H, 4.87, N, 13.50

(3) Molecular weights

As A and B are amphoteric compounds, the equivalent weights thereof were determined by titration and were found to be:

A: 623
B: 507

The molecular weight determination by Baryer method indicates the values of 560–770 for A and 420–560 for B.

(4) Molecular formulae

A: $C_{23}H_{32}N_6O_{14}$
B: $C_{17}H_{25}N_5O_{13}$ (5) Molecular formulae and calculated values of molecular weight and elementary composition A: Calculated for $C_{23}H_{32}N_6O_{14}$.—Molecular weight, 616.53: C, 44.80, H, 5.19, N, 13.63.
B: Calculated for $C_{17}H_{25}N_5O_{13}$.—Molecular weight, 507.31: C, 40.25, H, 4.97, N, 13.80.

(6) Chemical structures

A and B have the following chemical structures:

A:

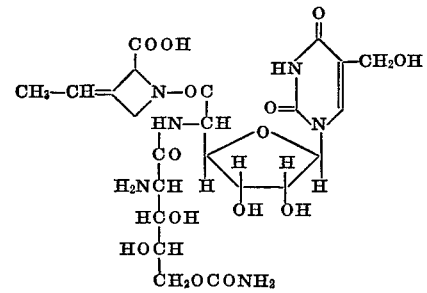

B:

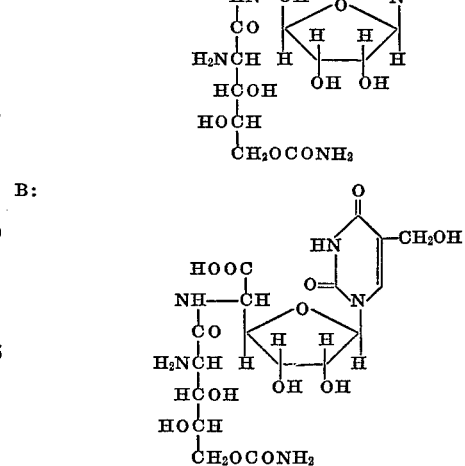

As shown in the above structures, it is noted that both A and B have the close similarity on their chemical structures.

(7) Specific optical rotations

A: $[\alpha]_D^{32}$ −32° (c.=1, in water)
B: $[\alpha]_D^{32}$ +34° (c.=1, in water)

(8) Ultraviolet absorption spectra

The spectra for A are shown in FIG. 1 and those for B in FIG. 2. These figures show maxima as follows:

A: $\lambda_{max.}^{0.05 N\ HCl} = 262$ m$\mu$ ($E_{1\ cm.}^{1\%}$ 142)

$\lambda_{max.}^{0.05 N\ NaOH} = 264$ m$\mu$ ($E_{1\ cm.}^{1\%}$ 103)

B: $\lambda_{max.}^{0.05\,N\,NCl} = 262\ m\mu$ ($E_{1\,cm.}^{1\%}$ 172)

$\lambda_{max.}^{0.05\,N\,NaOH} = 264\ m\mu$ ($E_{1\,cm.}^{1\%}$ 130)

(9) Infrared absorption spectra

The infrared absorption spectra for A and B are shown in FIG. 3 and FIG. 4, respectively, which are measured as potassium bromide tablets. Main absorption occurred at the following wave-lengths.

A: 3400, 1677, 1623, 1459, 1366, 1280, 1250, 1115, 1046, 773 cm.$^{-1}$

B: 3365, 1675, 1601, 1465, 1390, 1338, 1277, 1130, 1050, 784 cm.$^{-1}$

(10) Rf values

Rf values determined by developing with the solvent system of butanol-acetic acid-water (4:1:2 by volume), using the filter paper No. 51 (Toyo Roshi Co.) are as follows:

A: 0.28
B: 0.15

(11) Solubilities

Both A and B are easily soluble in water, but hardly soluble in methanol, ethanol, acetone, chloroform, benzene and ether.

(12) Color reactions

Both A and B give positive ninhydrin, diazo and Tollens tests but negative Fehling, 2,4-dinitrophenyl hydrazine, Molish, ferric chloride sodium nitroprusside and Sakaguchi tests.

(13) Pk'a values

Both A and B are amphoteric compounds, and they have three titratable groups. Pk'a values thereof are as follows:

A: 3.0, 7.3, 9.6
B: 3.0, 6.9, 9.4

(14) Stabilities

Both A and B are somewhat unstable in alkaline solution, but extremely stable in acidic and neutral solutions. No decomposition occurred on heating at 100° C. for 15 minutes in the pH range of 1.0 to 8.0. Both A and B are also stable to ultraviolet light irradiation. Their antifungal activities persist following placing of the solutions 30 cm. from a 20 w. chemical lamp and irradiating for 24 hours.

Summing up, comparison of the physico-chemical properties of polyoxins A and B with those of the known antibiotics indicates clearly that the former are novel antibiotics which are different from each of the latter.

The biological activities of polyoxins A and B will be hereunder described.

(1) Antimicrobial spectra

The following table shows the antimicrobial spectrum of polyoxins A and B in minimal inhibitory concentration for phytopathogenes. The minimal inhibitory concentration was determined 48 hours after incubating using a potato-sucrose agar medium and test organisms listed in the following table.

As shown in the table, both polyoxins A and B ar characterized in that they have very specific high activities against various phytopathogenes, for example *Alternaria kikuchiana*, *Cochliobolus miyabeanus*, *Pellicularia sasakii*, *Piricularia oryzae* and *Alternaria mali*, but are hardly active against other fungi, such as Trichophyton, Candida, Cryptococcus, Aspergillus and Mucor, and also inactive against all kinds of bacteria tested.

TABLE
Antimicrobial Spectrum of Polyoxins A and B

| Test organism | Minimal inhibitory concentration (mcg./ml.) | |
|---|---|---|
| | A | B |
| *Alternaria kikuchiana* | 1.56 | 1.56 |
| *Cochliobolus miyabeanus* | 1.56 | 6.25 |
| *Alternaria longipes* | 12.5 | 3.12 |
| *Alternaria brassicicola* | 12.5 | 3.12 |
| *Pellicularia sasakii* | 12.5 | 0.2 |
| *Piricularia oryzae* | 3.12 | 6.25 |
| *Alternaria mali* | 1 | 1 |
| *Alternaria solani* | 6.25 | 3.12 |
| *Diaporthe citri* | 10 | 10 |
| *Botrytis cinerea* | 6.25 | 3.12 |
| *Gloeosporium laeticolor* | <100 | 10 |
| *Glomerella cingulata* | 10 | 10 |
| *Colletorichum lagernarium* | <100 | 10 |
| *Gladosporium cucumerinum* | 1 | 0.1 |
| *Gladosporium fulvum* | 1 | 0.1 |
| *Fusarium oxysporum* | <100 | <100 |
| *Cercospora beticola* | 10 | 10 |
| *Guignardia laricina* | 0.1 | 0.1 |
| *Corticium rolfsii* | 10 | 10 |
| *Trichophyton asteroides* | >50 | >50 |
| *Trichophyton interdigitalis* | >50 | >50 |
| *Trichophyton rubrum* | >50 | >50 |
| *Candida albicans* | >50 | >50 |
| *Candida tropicalis* | >50 | >50 |
| *Candida crusei* | >50 | >50 |
| *Cryptococcus neoformans* | >50 | >50 |
| *Aspergillus fumigatus* | >50 | >50 |
| *Aspergillus terreus* | >50 | >50 |
| *Mucor racemosus* | >50 | >50 |
| *Nocardis asteroides* | >50 | >50 |
| *Trichomonas vaginalis* | >50 | >50 |
| *Staphylococcus aureus* 209p | >50 | >50 |
| *Micrococus luteus* | >50 | >50 |
| *Bacillus subtilis* | >50 | >50 |
| *Mycobacterium smegmatis* | >50 | >50 |
| *Mycobacterium* 607 | >50 | >50 |
| *Mycobacterium phlei* | >50 | >50 |
| *Mycobacterium BCG* | >50 | >50 |
| *Escherichia coli* | >50 | >50 |
| *Pseudomonas aeruginosa* | >50 | >50 |
| *Sarratia marscens* | >50 | >50 |
| *Proteus vulgaris* | >50 | >50 |
| *Xanthomonas oryzae* | >50 | >50 |

(2) Action and efficacy on practical use

Polyoxins A and B have superior actions to prevent the mycerial growth and the spread of disease spot, and also have superior persistence, based on results of pot tests and field trials.

The above characteristic actions and persistence of polyoxins A and B will be hereunder described.

(1) Action

The mycerial growth preventive actions of polyoxins A and B are powerful and also the sporulation preventive actions are strong, but spore germination preventive actions are comparatively weak. However, although the spore which has come into contact with polyoxins A and B does once germinate, the germ-tubes do not elongate, but swell into a global form to a size of 2 to 3 times the diameter of the original spore.

This phenomenon occurred completely at 1 p.p.m. of polyoxins A and B and even with 0.1 p.p.m. the phenomenon was considerably marked, and with a minimum of 0.065 p.p.m. it was still noticed. This abnormal or deformed spore loses all properties as a pathogen.

And with the mycelium, the similar phenomenon of swelling into global form was observed.

(2) Usage

For commercial use as an agricultural chemical, polyoxins A and B can be prepared as a dust preparation, an emulsifiable concentrate or a wettable powder, each containing the active polyoxins A and/or B, according to conventional procedures. For example, said polyoxins can be admixed with solid or liquid carriers, such as talc, clay, silica, water, methanol, ethanol, acetone, dimethylformaldehyde, and ethyleneglycol.

In addition, said polyoxins can be mixed with adjuvants generally used for agricultural chemicals. The adjuvants may be mixed with said polyoxins in wide range of forms, such as in the form of emulsion, dispersions or a solid mixture. For example, such adjuvants are non-ionic, anionic and cationic surface active agents, such as polyoxyethylene, alkyl allylether, alkyl allyl polyethyleneglycolether, alkyl allyl sorbitan monolaurate, alkyl allyl sulfonate, alcoholic ester of sulfate and alkyl dimethyl benzyl ammonium halide, and Formalin condensates of ligninsulfonate and dinaphthylmethane disulfonate, and stearates, polyvinyl alcohol, carboxymethyl cellulose and gum arabic.

The preparations of said polyoxin dust, emulsifiable concentrate and wettable powder will be described in Examples 4 to 6.

The polyoxin dust preparation, emulsifiable concentrate and wettable powder are each applied to plants in a form as it is, or in a liquid form diluted with water under agitation according to the desired concentration. When the polyoxins are used to prevent infestation of sheath blight on rice-plants, the polyoxin preparation is tested for potency using *Pellicularia sasakii* ACI-1134 as a test organism, and then the potency is expressed in a unit designated "P.s.u." When the polyoxins are used to prevent disease caused by the Alternaria species in fruit orchards, the polyoxin preparation is tested for potency using *Alternaria mali* Roberts ACI-1157 as a test organism, and then the potency is expressed as the unit "A.m.u."

One "P.s.u." or one "A.m.u." is the potency of one microgram of polyoxin B when used to repress *Pellicularia sasakii* ACI-1134 or *Alternaria mali* Roberts ACI-1157, respectively.

(a) Application to disease on rice-plant:
  (i) When polyoxin dust is used against sheath blight on rice-plants (*Pellicularia sasakii*) in a concentration of 0.2%, the potency of the dust is expressed in 2,000 P.s.u./g. on the basis of polyoxin B. The polyoxin dust was scattered at the roots and sheaths of rice-plants at a rate of 2 to 5 kg./10 areas.
  (ii) When polyoxin emulsifiable concentrate is used against sheath blight on rice-plants in a concentration of 3.0%, the potency of the emulsifiable concentrate is expressed in 30,000 P.s.u./g. on the basis of polyoxin B. The polyoxin emulsifiable concentrate was sprayed on sheaths of rice-plants at a rate of 17 cc. for 10 l. water.

(b) Application to disease of fruit orchard:
  (i) When polyoxin wettable powder (10.0% concentration) is used against black spot of pear (*Alternaria kikuchiana*), the potency of said wettable powder is expressed in 100,000 A.m.u./g. on the basis of polyoxin B. The polyoxin wettable powder was diluted with water under agitation at a rate of 10 g. per 10 l. water and sprayed on leaves of pears.
  (ii) When polyoxin wettable powder (10.0% concentration) is used against Alternaria leaf spot of apple (*Alternaria mali*), the potency of said wettable powder is expressed in 100,000 A.m.u./g. on the basis of polyoxin B. The polyoxin wettable powder was diluted with water under agitation at a rate of 10 g. per 10 l. water and sprayed on leaves of apples.

(3) Efficacy

In pot tests to prevent infestation of sheath blight on rice-plants (*Pellicularia sasakii*), polyoxins A and/or B at a concentration of 25 p.p.m. and more showed better efficacy than another fungicide, organoarsenates, at 40 p.p.m. Also, in pot tests to prevent the spread of disease spots, superior efficacy was observed.

Furthermore, in pot tests to prevent infestation of rice blast (*Piricularia oryzae*) and to prevent the spread of the disease spots, polyoxin A and/or B showed similar high efficacy to that in above tests.

The persistence of polyoxin A and/or B on rice-plants has been investigated at varying concentrations based on biological activity. Polyoxin A and/or B concentration of 100 p.p.m. were shown to persist for at least 12 days and 50 p.p.m. for at least 9 days.

Based on these data, field trials to control the sheath blight on rice-plants were carried out. Two applications of polyoxin dust containing polyoxin A and/or B at 50 p.p.m. had equal efficacy as two applications of another fungicide, organoarsenates, at 32.5 p.p.m.

Moreover, it was noted that the more the number of applications or the higher the concentration, there was a tendency of increased yields.

Further, application could be made at any stage of growth of rice-plants without producing phytotoxicity.

One of the results of field trials of polyoxin dust containing polyoxin A or B against sheath blight on rice-plants is shown in Example 7.

Besides the sheath blight on rice-plants, polyoxins A and B showed high control efficacy against diseases caused by Alternaria species on top fruit orchards, such as black spot on pear (*Alternaria kikuchiana*) and Alternaria leaf spot on apple (*Alternaria mali*).

One of the results of field trials of polyoxin B against black spot disease on pears and Alternaria leaf spot disease on apples showed that several applications of polyoxin wettable powder containing polyoxin B at 50 to 100 p.p.m. had effectively controlled these diseases as shown in Examples 8 and 9.

Moreover, polyoxin B showed high control efficacy against other diseases, that is, Alternaria sooty spot of cabbage (*Alternaria brassicicola*), brown spot of tobacco (*Alternaria longipes*) and Anthracnose of peach (*Gloeosporium laeticolor*).

These results are shown in Examples 10 to 12.

As described in the above tests, it is noted that polyoxins A and B are fully useful for immediate commercial use as agricultural fungicides.

Besides the above-mentioned diseases, polyoxins A and B have great promise to be used commercially as agricultural fungicides having high control efficacy against diseases caused by phytopathogens, such as leaf mold of tomato (*Cladosporium fulvum*), Early blight of potato (*Alternaria solani*), shoot blight of Japanese larch (*Guignardia laricina*) and Gary mold of grape (*Botrytis cinerea*).

Summing up, it is noted that polyoxins A and B are novel antibiotics having superior preventive and curative actions and efficacy against various diseases caused by phytopathogens without producing phytotoxicity and toxicity, as shown in results of their tests using each of various phytopathogens in greenhouse and in the field, and also there was a tendency of increased yields of crops in connection with applications of said polyoxins.

(3) Phytotoxicity and toxicity (A) Phytotoxicity:
In phytotoxicity test on rice-plants and various crops polyoxins A and B were non-phytotoxic when used as foliar sprays of concentration of 200 p.p.m. or more. Namely, no phytotoxic signs were noticed even in sprays of concentration of 800 p.p.m. on rice-plants, and sprays of concentration of 200 p.p.m. on most other crops, such as apple, pear and tomato.

(B) Toxicity:
(1) In toxicity test with mice both polyoxins A and B were non-toxic in intravenous injection of 800 mg./kg. or oral administration of 150 mg./kg.
(2) In toxicity test with rabbits solution of 400 mg./ml. produced no irritation when instilled into the conjunctival sac of rabbits.
(3) No dermal toxicity was detected.
(4) In toxicity test with fish both polyoxins A and B at the concentration of 10 p.p.m. were non-toxic during 75 hours period of exposure.

SUMMARY OF THE INVENTION

Polyoxins A and B are each an antibiotic which is prepared by cultivating novel strains of *Streptomyces cacaoi* var. *asoensis* [ATTC access numbers 19093 (Type I) and 19094 (Type II)] in a culture medium and then separating polyoxin complex containing said polyoxins A and B produced from the culture medium into each of polyoxins A and B.

Based on the physico-chemical and biological properties, especially the chemical structural and the efficacy of said antibiotic, it is noted that said antibiotic, as compared with the known antibiotics, is a novel one.

Carrying out pot tests and field trials, superior results were obtained for the efficacy of said antibiotic to be extremely useful for an agricultural fungicide for the protection of plants on the practical use without producing phytotoxicity and toxicity.

Further, besides said antibiotic can be practically used as an agricultural fungicide for protection of plants within the range of various tests, it is of great promise to be practically used as an agricultural fungicide having high efficacy against other various phytopathogenes.

Moreover, it is noted that the applications of said antibiotic show a tendency to increase yields of crops.

Figure 1:
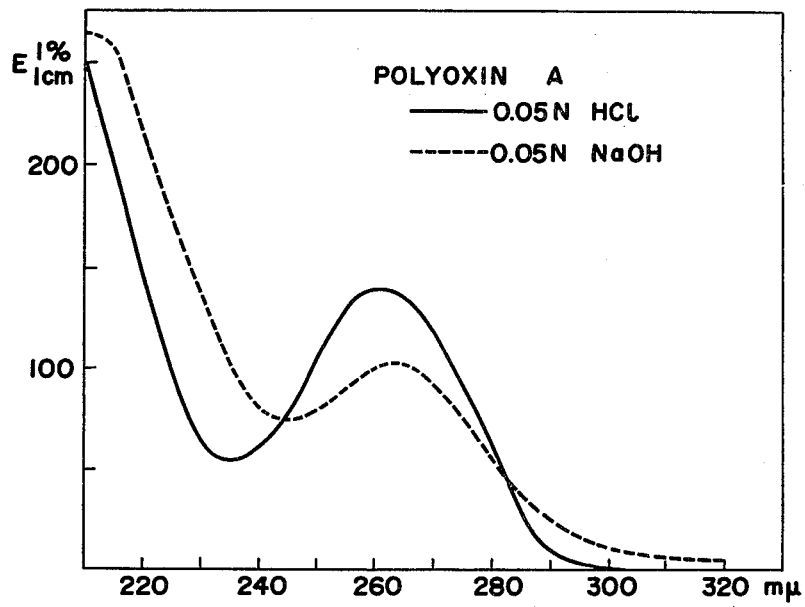
FIGS. 1-2 indicate ultraviolet absorption spectra for polyoxins A and B, respectively.
Figure 2:
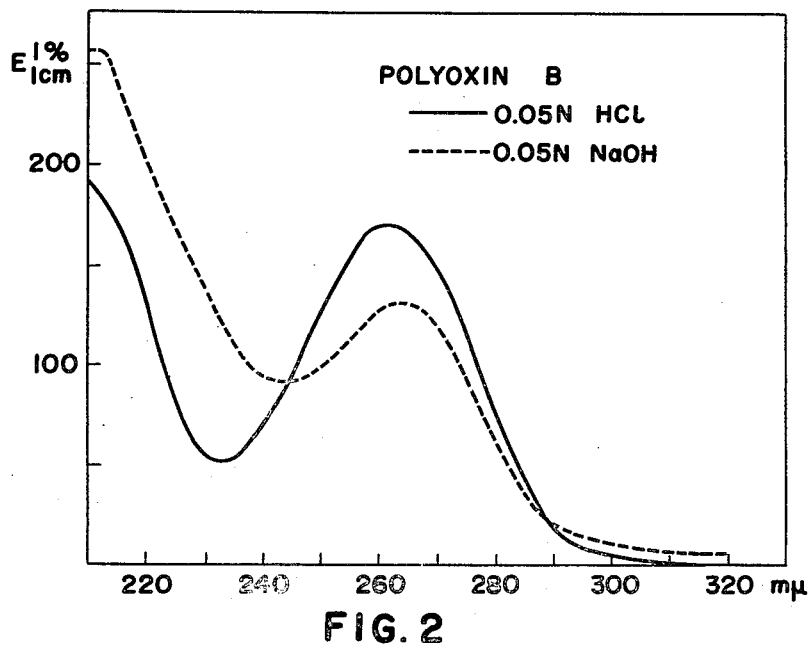
Figure 3:
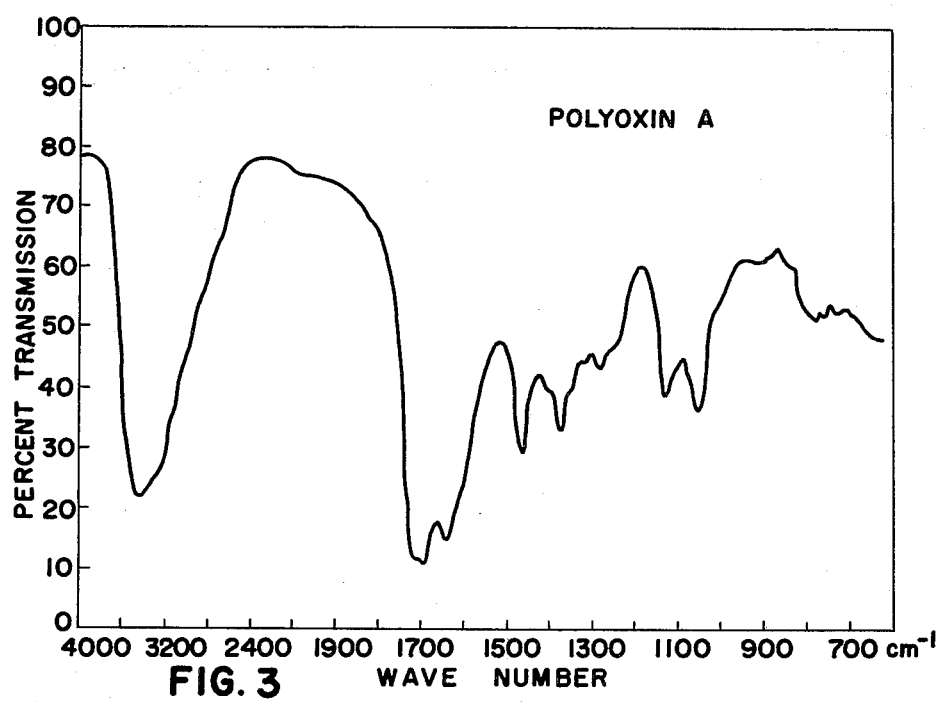
FIGS. 3-4 show infrared absorption spectra for polyoxins A and B, respectively.
Figure 4:
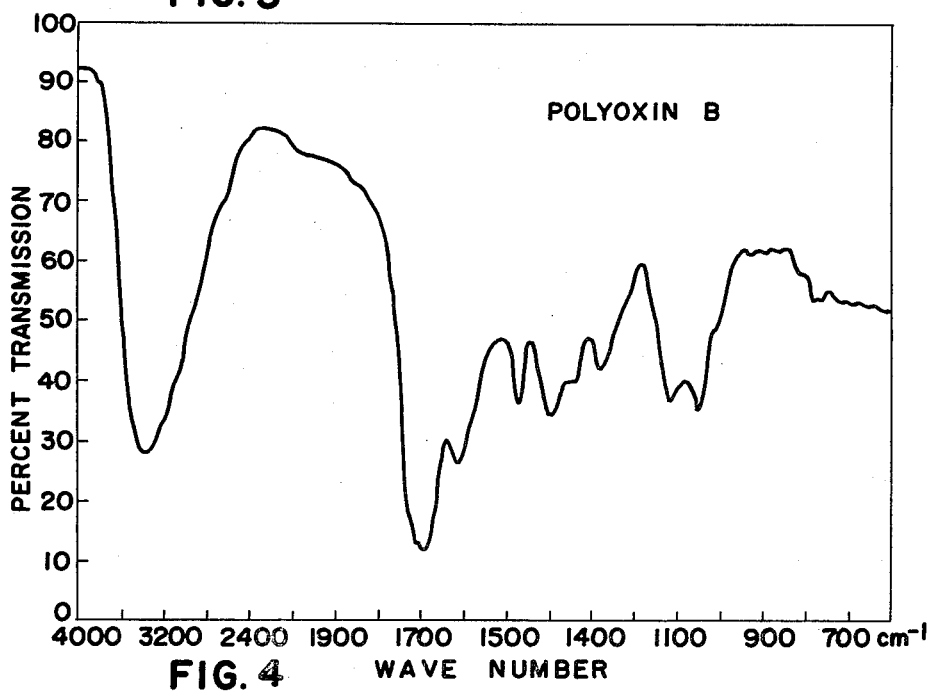

Examples of the present invention are shown hereinafter.

Example 1

(a) Fermentation procedure.—A culture medium was prepared having the following composition:

glucose—15 g. (1.5%)
glycerine—10 g. (1.0%)
soybean meal—15 g. (1.5%)
ammonium sulfate—5 g. (0.5%)
dried yeast—5 g. (0.5%)
sodium chloride—5 g. (0.5%)
calcium carbonate—4 g. (0.4%)
water—1000 ml.

The pH of the medium was adjusted to 7.6, and sterilization was carried out at a temperature of 120° C. for 20 minutes.

The strain of *Streptomyces cacaoi* var. *asoensis* (Type I, ATCC 19093) was inoculated into the culture medium and fermented therein at a temperature of 27° C. under stirring which was maintained until maximum potency was obtained. Assay was made using *Alternaria kikuchiana* and *Cochliobolus miyabeanus* as test organisms. When the strain of *Streptomyces cacaoi* var. *asoensis* Type I was shaken-cultured in 300 ml. Erlenmeyer's flask containing 70 ml. of the medium, the potency reached a level after 72–96 hours (1.8 mg./ml.). When the 48 hours shaken-cultured broth was inoculated into a fermentation tank containing 400 liters of the same medium and the fermentation was carried out under agitation at a rate of 220 r.p.m. and aeration at a rate of 400 liters per minute, the production of the antibiotic reached a maximum after about 72 hours fermentation.

(b) Isolation and purification.—430 liters of the fermented broth was acidified to a pH of 2.0 with 10% hydrochloric acid and then heated up to 70° C. and added to 9 kg. of diatomaceous earth, followed by filtering in a filter press. The filtrate was treated with 8 kg. of activated carbon and 8 kg. of diatomaceous earth, stirred and filtered. The activated carbon was washed with 350 liters of water. The active principles were then eluted twice with 100 liters of 60% aqueous acetone. The eluted solution was concentrated in vacuo. Thus, 4 liters of liquid containing the desired products were obtained.

50 liters of acetone were added to the liquid and the resultant precipitate was dried under reduced pressure to obtain 644 g. of brown crude powder. 370 g. of this powder were dissolved in water and acidified to a pH of 2.0. The acidified solution was passed through a column packed with 4.5 liters of Dowex 50 WX8 (50–100 mesh, H-form). After washing with water, the antibiotics were eluted with a 5% aqueous sodium chloride solution. The active eluates were collected and treated with carbon to remove inorganic salts. After the concentration of eluates from the carbon treatment 60 g. of pale brown powder was obtained.

This powder was chromatographed again on Dowex 50 WX8. This powder was dissolved in 0.1 M phosphate buffer of pH 2.0 and adsorbed on a column packet with 2 liters of Dowex 50 WX8 (100–200 mesh) which was buffered with phosphate buffer of pH 2.0. The antibiotics were eluted with 0.1 M phosphate buffer of pH 4.3. Active eluates were treated with carbon as described above to remove inorganic salts: resulting in a yield of 29 g. of pale yellow powder. This was further purified by chromatography using sulfoethylsephadex which is a strongly acidic exchange resin of a sulfoethyl type. Namely, this powder was applied to the 50 g. column of sulfoethylsephadex (SE–C–25) previously buffered with 0.01 M phosphate buffer (pH 2.0). By successively increasing the concentration of the buffer up to 0.1 M the antibiotics were eluted. Thus, 14 g. of the purified white powder of polyoxin complex were obtained.

(c) Separation of polyoxin A and B.—The resulting polyoxin complex consists of at least four active materials including polyoxins A and B as its main components. Cellulose column chromatography was carried out in order to separate A and B in a pure state. Namely, distribution chromatography on a cellulose column (55 x 1,000 mm.) was carried out using the solvent system of butanol-acetic acid-water (4:1:2 by volume). At first, polyoxin A was eluted, then followed by polyoxin B. 2 g. of polyoxin A and 0.4 g. of polyoxin B were thus obtained from 5 g. of polyoxin complex.

A zone electrophoresis technique was used for the purpose of the further purification of polyoxins A and B. Namely, using zeon resin as carrier and 0.1 M phosphate buffer of pH 4.3, electrophoresis was carried out at 150 volts for 16 hours. Water extraction from the main fraction and subsequent carbon processing yielded each of polyoxin A and B in pure form. The yield of this procedure was about 50%.

Finally, the crystallization was carried out from aqueous ethanol. Polyoxin A was obtained as colorless needles. Polyoxin B was obtained as colorless amorphous powder.

Example 2

A culture medium was prepared having the following composition:

| | G. |
|---|---|
| Sucrose | 60 |
| Glucose | 15 |
| Dried yeast | 35 |
| Soybean meal | 15 |
| Potassium phosphate | 2 |
| Calcium carbonate | 4 |

Water, 1000 ml.

The pH value of the medium was not further adjusted and fermentation was carried out following a similar procedure to that employed in Example 1. The concentration of polyoxin reached 3 mg./ml., calculated on the basis of the activity of polyoxin A, from 72 to 96 hours after inoculation with *Streptomyces cacoai* var. *asoensis* Type I (ATCC 19093).

The polyoxins A and B were separated from the cultured medium by a similar procedure to that described in Example 1. Yield: polyoxin A, 1.5 g., polyoxin B, 0.7 g. from 4.2 g. of polyoxin complex.

Example 3

A culture medium was prepared having the following composition:

| | G. |
|---|---|
| Soluble starch | 70 |
| Glucose | 5 |
| Soybean meal | 15 |
| Sodium chloride | 2 |
| Calcium carbonate | 4 |
| Water, 1000 ml. | |

The pH of the medium was adjusted to 7.0 and fermentation was carried out employing a similar procedure to that employed in Example 1, except for the inoculation of *Streptomyces cacaoi* var. *asoensis* Type II (ATCC 19094) instead of Type I.

The concentration of polyoxin reached 7 mg./ml., calculated on the basis of the activity of polyoxin A, from 72 to 96 hours after inoculation of the medium with *Streptomyces cacaoi* var. *asoensis* Type II.

The polyoxins A and B were separated from the culture medium by a similar procedure to that described in Example 1. Yield: polyoxin A, 1.2 g., polyoxin B, 1.4 g. from 4.5 g. of polyoxin complex.

In Examples 4-6, the references to "parts" are to parts by weight.

Example 4

Dust preparation.—0.2 part polyoxin A (or B, or complex), 0.5 part stearic acid calcium, 50 parts talc and 49.3 parts clay were mixed and crushed.

The preparation is a white powder of 300 mesh and more.

Polyoxin dust obtained was scattered on plants at a rate of 2-5 kg./10 are.

Example 5

Emulsifiable concentrate.—Five parts polyoxin A, 3 parts polyoxin B, 10 parts dimethylformamide, 10 parts dimethylbenzylammonium chloride and 52 parts methanol were mixed and dissolved.

The preparation is pale yellow in color. Polyoxin emulsifiable concentrate obtained was diluted with water under agitation within the range of 10 to 200 p.p.m. and sprayed on plants.

Example 6

Wettable powder.—Ten parts polyoxin A (or B, or complex), 5 parts sulfuric laurate calcium, 2 parts Formalin condensate of dinaphthylmethan disulfonate and 83 parts clay were mixed and crushed.

The preparation is a white powder and easily soluble in water.

Polyoxin wettable powder obtained was diluted with water under agitation within the range of 10 to 200 p.p.m. and sprayed on plants.

Example 7

The results of field trials of polyoxin dust containing each polyoxins A and B against sheath blight on rice-plant were as follows:

| | | | | Yield (g.) | |
|---|---|---|---|---|---|
| Treatment | Infected stock, percent | Infected stem, percent | Degree of damage | Wt. of grains per 3.3 m.² | Wt. of 1,000 grains |
| Polyoxin dust (A) 0.2% | 29.3 | 11.7 | 14.7 | 2,409 | 27.7 |
| Polyoxin dust (B) 0.15% | 36 | 8.6 | 16.2 | 2,440 | 23.1 |
| Monzet dust | 21.3 | 4.9 | 9.4 | 2,367 | 20.7 |
| Control | 85.3 | 59.5 | 68.9 | 2,148 | 19.7 |

NOTE.—66 m.²/one plot. Applications: 1st, booting stage; 2nd, period all ears were out. Monzet dust: Thiuram 1.2, Ziram 0.6, Urbazid 0.23, calcium methylarsonate 0.22.

Example 8

The results of field trials of polyoxin B against black spot disease on pear were as follows:

| Treatment | Concentration, p.p.m. | Percentage of infected leaves | | | | | No. of spot per leaf, percent | Diseased fruit, percent |
|---|---|---|---|---|---|---|---|---|
| Polyoxin B (w.p.)* | 40 | 6.8 | 3.3 | 2.4 | 4.7 | 6.4 | 0.05 | 0/9 |
| Do.* | 100 | 2.5 | 3.1 | 2.6 | 4.6 | 6.3 | 0.05 | |
| Difoltan | 670 | 3.3 | 6.6 | 16.6 | 20.1 | 21.4 | 0.45 | |
| Bordeaux | | 11.6 | 11.6 | 16.6 | 22.6 | 30.1 | 0.41 | 2/9 |
| Control | | 35.4 | 55.2 | 83.4 | 94.8 | 97.5 | 8.0 | 7/7 |

*"w.p." means "wettable powder." Sprays: 6 times each 10 days.

Example 9

The results of field trials of polyoxin B against Alternaria leaf spot on apple were as follows:

| Treatment | Concentration, p.p.m. | Number of investigated leaves | Number of infected leaves and percent | Number of spot per one leaf and percent |
|---|---|---|---|---|
| Polyoxin B (w.p.) | 100 | 1,012 | 35(3.5) | 221(0.218) |
| Difoltan | 670 | 1,012 | 149(14.7) | 280(0.276) |
| Control | | 1,012 | 301(29.7) | 821(0.811) |

NOTE.—Sprays: 4 times each 10 days.

Example 10

The results of field tests against Alternaria sooty spot of cabbage (*Alternaria brassicicola*) were as follows:

Applications: 4 times
Method of evaluation: Shells were harvested on June 30 and percentage of infected shells were calculated.
Results:

| Chemicals | Concentration, p.p.m. | Percent of infected shell |
|---|---|---|
| Polyoxin B (w.p.) | 50 | 28.4 |
| Bordeaux | | 63.5 |

As the result, four times applications of polyoxin B at the concentration of 50 p.p.m. showed prominent effect to control of Alternaria sooty spot of cabbage.

Example 11

The result of field tests against brown spot of tobacco (*Alternaria longipes*) were as follows:

Application: 4 times, 180 l./10 a. per ounce.
Results:

| Chemicals | Concentration, p.p.m. | Percent of infected leaves |
|---|---|---|
| Polyoxin B (w.p. 10%) | 200 | 0.6 |
| Zineb 65% | 1,300 | 6.3 |
| Control | | 7.8 |

As the result, four times applications of polyoxin B at the concentration of 200 p.pm. showed marked control of brown spot of tobacco.

Example 12

The results of field tests against Anthracnose of peach (*Gloeosproium lacticolos*) were as follows:

Applications: 6 times
Method of evaluation: All fruits on tested trees were harvested on September 6 and percentages of infected fruits were calculated.

Results:

| Chemicals | Concentration, p.p.m. | Percent of infected fruits per tree |
|---|---|---|
| Polyoxin B (w.p.) | 70 | 3.0 |
| Triazine | 400 | 2.6 |
| Euparen | 625 | 3.9 |
| Control | | 81.6 |

As the result, six times applications of polyoxin B at the concentration of 70 p.p.m. showed efficacy of the same rank with triazine and euparen.

We claim:
1. An antibiotic, polyoxin A having the structure:

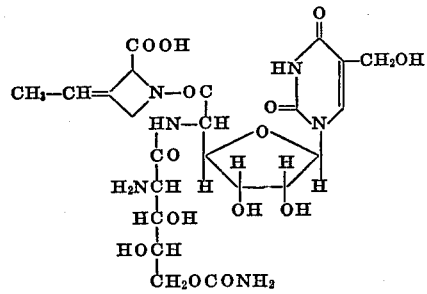

2. An antibiotic, polyoxin B having the structure:

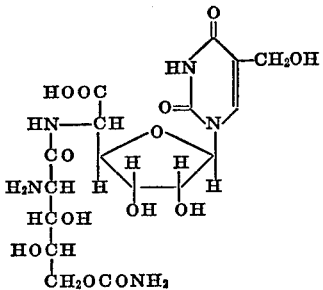

3. A process for preparing antibiotics, polyoxins A and B comprising inoculating a strain of *Streptomyces cacaoi* var. *asoensis* selected from the group consisting of ATCC access numbers 19093 and 19094 in a culture medium composed of a carbon source, a nitrogen source and an inorganic material, cultivating said medium at a temperature of from about 25 to 35° C. for a time sufficient to impart substantial antibiotic activity to said culture medium and to produce polyoxin complex containing said polyoxins A and B in said medium, collecting said complex from said culture medium, and then separating said complex into each of polyoxins A and B.

4. A process according to claim 3, wherein the cultivation is carried out under aerobic submerged fermentation and stirring condition.

5. A process according to claim 3, wherein the cultivation is carried out for from about 40 to 100 hours.

6. A process according to claim 3, wherein the carbon source is selected from the group consisting of starch, dextrin, glucose, glycerine, maltose and fructose.

7. A process according to claim 3, wherein the nitrogen source is selected from the group consisting of meat extracts, peptone, corn-steep liquor, soybean powder, peanut powder, cotton-seed powder and yeast.

8. A process according to claim 3, wherein the inorganic material is selected from the group consisting of sodium chloride, potassium chloride, calcium carbonate and other phosphate.

9. A process according to claim 3, wherein the separation of polyoxins A and B from each other is carried out by cellulose column chromatography using a solvent system of butanol, acetic acid and water to elute said polyoxins A and B.

10. A process according to claim 9, wherein the ratio by volume of butanol:acetic acid:water=4:1:2.

11. A process according to claim 9, wherein the separation of polyoxins A and B from each other is carried out by zone electrophoresis using zeon resin and phosphate buffer to recrystallize said polyoxins from an aqueous alcohol.

12. A process for preparing an antibiotic, polyoxin complex containing the antibiotics, polyoxins A and B, comprising inoculating a strain of *Streptomyces cacaoi* var. *asoensis* selected from the group consisting of ATCC access numbers 19093 and 19094 in a culture medium composed of a carbon source, a nitrogen source and an inorganic material, cultivating said medium at a temperature of from about 25 to 35° C. for a time sufficient to impart substantial antibiotic activity to said culture medium and to produce said complex in said medium, and then collecting said complex from said medium.

13. A process according to claim 12, wherein the cultivation is carried out under aerobic submerged fermentation and stirring condition.

14. A process according to claim 12, wherein the cultivation is carried out for from about 40 to 100 hours.

15. A process according to claim 12, wherein the carbon source is selected from the group consisting of starch, dextrin, glucose, glycerine, maltose and fructose.

16. A process according to claim 12, wherein the nitrogen source is selected from the group consisting of meat extracts, peptone, corn-steep liquor, soybean powder, peanut powder, cotton-seed powder and yeast.

17. A process according to claim 4, wherein the inorganic material is selected from the group consisting of sodium chloride, potassium chloride, calcium carbonate and other phosphate.

References Cited

FOREIGN PATENTS 6512423  3/1966  Netherlands _____ 260—211.5

JEROME D. GOLDBERG, Primary Examiner

U.S. Cl. X.R.

195—80; 424—180